March 4, 1947. W. R. KEHOE 2,416,875
SYSTEM FOR CONTROLLING FLOW OF FLUIDS
Filed March 16, 1943 2 Sheets-Sheet 1
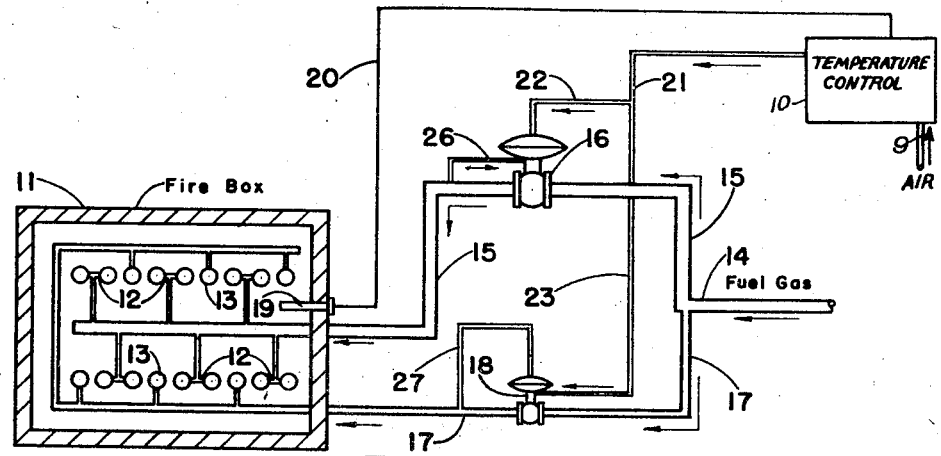
FIG. 1.
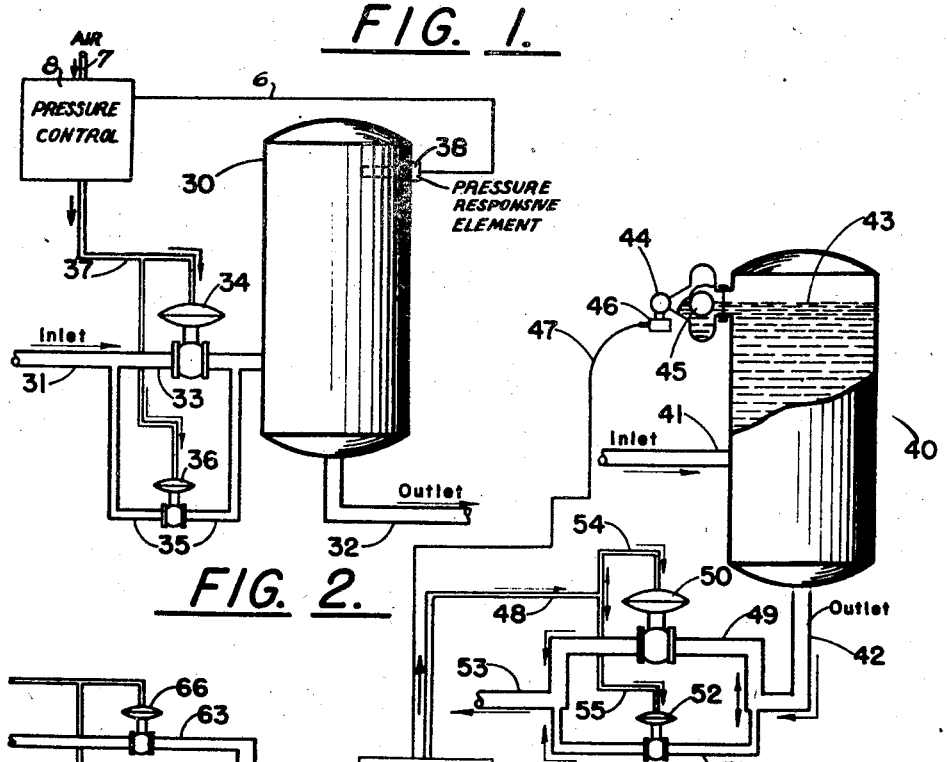
FIG. 2.
FIG. 3.
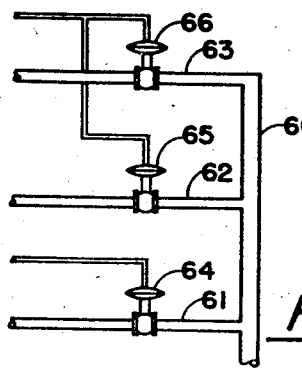
FIG. 4.
William R. Kehoe INVENTOR.
BY
J. G. McKean
ATTORNEY.

March 4, 1947.   W. R. KEHOE   2,416,875
SYSTEM FOR CONTROLLING FLOW OF FLUIDS
Filed March 16, 1943   2 Sheets-Sheet 2

William R. Kehoe INVENTOR.
BY
J. D. McKean
ATTORNEY.

Patented Mar. 4, 1947

2,416,875

UNITED STATES PATENT OFFICE 2,416,875

SYSTEM FOR CONTROLLING FLOW OF FLUIDS

William R. Kehoe, Baytown, Tex.

Application March 16, 1943, Serial No. 479,317

8 Claims. (Cl. 137—68)

1

The present invention is directed to a system for controlling the flow of fluids in lines within precise limits.

Industrial operations often require the flow of fluid in a line to be controlled accurately in accordance with a preselected variable. Well known examples are the control of the amount of gas or oil being supplied through a fuel line to a furnace in accordance with temperature variations in the furnace. Further examples are the control of rate of flow to or from vessels at such a rate as to maintain a substantially constant pressure therein and the control of rate of flow to or from vessels to maintain a substantially constant liquid level therein.

It is an object of the present invention to provide a method for controlling the flow of fluid in lines in accordance with a predetermined variable, which will give a closer control than do the systems at present employed.

More specifically, it is an object of the present invention to provide a control means which will reduce or eliminate hunting or over control and accordingly give a smoother and more precise result.

The present invention may be described briefly as involving a method for controlling the flow of a fluid stream by dividing it into a multiplicity of streams and. in response to stimulus from the controlling factor, altering the rate of flow in a major part of the fluid in one direction and simultaneously altering the rate of flow in a minor portion of the fluid in the opposite direction. The activating stimulus may be one of a number of variable factors, for example, changes in temperature, pressure or liquid level, or if desired a combination of these factors.

Other objects and advantages of the present invention may be seen from a reading of the following description taken with the drawing in which Figure 1 is an elevation partly in section illustrating the application of the system of the present invention to the control of fuel gas to a gas fired furnace;

Figure 2 shows the application of the system to a container for controlling the pressure within the container;

Figure 3 illustrates an application of the system to a vessel for precisely controlling the fluid level within said vessel;

Figure 4 is a fragmentary view of another embodiment; and

Figure 5 shows a control system applied to

Figure 5:
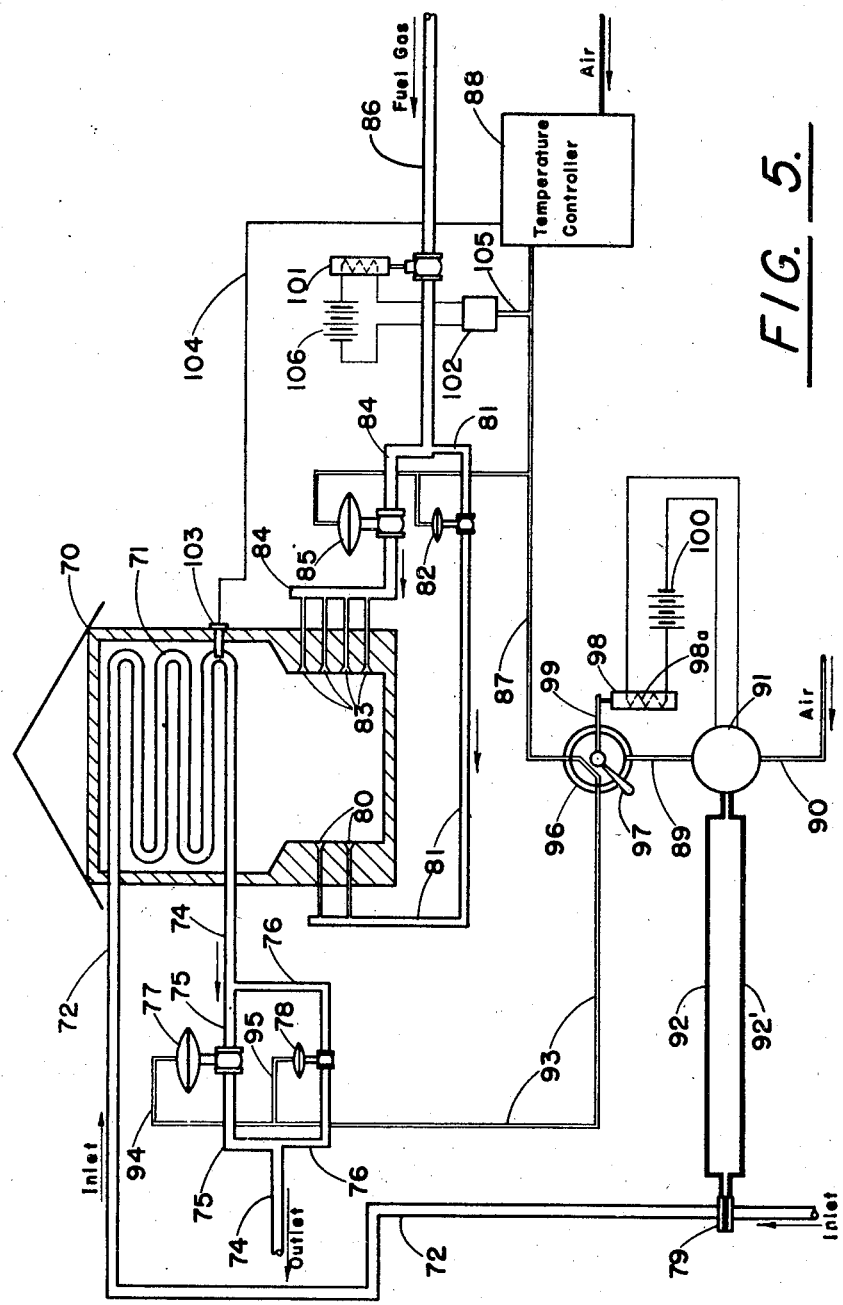

2 regulate both the flow of liquid fuel to a furnace and the flow of liquid being heated therein.

Referring now specifically to the drawing, and first to Figure 1, a fire box 11 of a furnace or heater is provided with groups of burners 12 and 13. Fuel gas for burner group 12 is supplied by branch line 15 in communication with gas main or pipe line 14 and that for burner group 13 is supplied by branch line 17. Branch line 15 is provided with regulator valve 16 and branch line 17 with regulator valve 18. It will be evident from the drawing that the capacity of branch line 15 and valve 16 is substantially greater than that of branch line 17 and valve 18 and supplies a larger number of burners. Both valves 16 and 18 are of the type known as floating or throttling.

The amount of opening of valves 16 and 18 is adjusted in response to temperature changes within fire box 11 of the furnace. A temperature responsive means is shown diagrammatically as element 19 provided with connection 20. In the heating of fluids in fire box 11, element 19 should be located in the fluid being heated. The physical adjustment of the amount of opening of valves 16 and 18 may be accomplished by the changes in air pressure transmitted by air line 21 and branch lines 22 and 23 to valves 16 and 18, respectively. Valves 16 and 18 are connected to lines 15 and 17, respectively, by lines 26 and 27 so that the pressure in these lines may be caused to act on said valves in opposition to the air pressure in lines 22 and 23, respectively. The temperature responsive means and the units for controlling the flow of air in line 21 are not shown in any greater detail in the drawing because they are well known in the art of regulating the flow of fluid. Valves which may be employed for units 16 and 18 and the other portions of the control system are shown in Perry's Chemical Engineer's Handbook, pages 1643 to 1720, and Catalogue 4050 of the Bristol Company.

It is the essence of the present invention that valve 18 is provided with control means to operate it simultaneously or substantially simultaneously with valve 16 but in the opposite direction. For example if the control means operates valve 16 to allow a greater flow of fuel gas to burners 12, valve 18 will be operated at the same time to reduce the flow of gas to burners 13. Valve 16, being the larger of the two, may be operated for example to allow a relatively large increase in the flow of fuel gas, whereas valve 18 will cause a much smaller decrease in the total fuel gas being supplied the fire box. If, on the other hand, valve 16 is operated to reduce the flow of gas through branch line 15, the valve 18 will be simultaneously operated to increase the flow through branch line 17.

It is an advantage of the particular arrangement described above that the time lag and over control commonly encountered when using a single control valve is avoided by using dual valves. Conventional control mechanism is employed for both valve 16 and 18. If only a single valve were used, the signal transmitted to the single valve would cause a greater change in valve setting than necessary for the stabilization of conditions. This over correction would in turn soon entail a reverse correction, making for constant oscillation or hunting of the valve control mechanism. The employment of two valves, one large and responding directly to the activating signal, and a second smaller and operating in the opposite direction, minimizes or eliminates the factor of hunting in the control mechanism and allows the controlling means to operate with precision over a wide range of conditions. It will, of course, be evident in a modification of Figure 1 that instead of two branch lines, one large and one small, a multiplicity of branch lines may be provided with a control valve on each line. In such a case the major portion of the fluid being controlled will be controlled by a mechanism responding directly to the stimuli of the variable selected, and a minor portion will act in the opposite direction to compensate for the over control of the major portion of the fluid.

As an example of suitable ratios of sizes to be used it has been found that unit 15 may be a two-inch line and unit 16 may be a one-and-a-quarter-inch valve, while unit 17 may be a three-fourth inch line, and unit 18 a half-inch valve.

Turning now to Figure 2, a container or vessel 30 is provided with an inlet line 31 for fluid to be treated and an outlet line 32. Adjacent the vessel 30 inlet line 31 splits into two branches, a larger branch 33 provided with control valve 34 and a smaller branch 35 provided with control valve 36. Valves 34 and 36 are preferably controlled by means of the pressure in air line 37 which in turn is responsive to a suitable pressure responsive means 38 arranged in vessel 30 and suitably arranged to throttle the flow of air in line 37. A specific control means is not illustrated in Figure 2 since it is conventional to the art, suitable types being shown for example in the Chemical Engineer's Handbook, supra. Valves 34 and 36 are of the spring loaded throttling type and one arranged to be direct acting and the other reverse acting. In other words, when the pressure in vessel 30 becomes greater than a predetermined amount valve 34 reduces the flow through line 33 and when it becomes less than a predetermined amount valve 34 allows the rate of flow to increase. Valve 36 is arranged to reduce the rate of flow through line 35 when the rate of flow is increased in line 33 and to increase it when valve 34 reduces the flow in line 33. This reverse action of the smaller valve 36 with respect to the larger serves the same purpose in controlling pressure as does the arrangement in Figure 1 serve in controlling temperature. That is to say, the reverse arrangement eliminates or minimizes the over control or hunting commonly encountered in control systems.

Still another embodiment of the present invention is illustrated in Figure 3, wherein a system for maintaining liquid level at a predetermined point is applied to a vessel. In this embodiment a container or vessel 40 is provided with an inlet 41 for liquid and outlet 42. It is desired to maintain the liquid level in this vessel at a predetermined point such as 43 and for this purpose a control mechanism is provided. A suitable liquid level control means 44 is mounted on the wall of the vessel with the float 45 at the predetermined liquid level and a control means 46 arranged to be activated by the float 45. Float type liquid level controllers are, of course, conventional to the art and for this reason the mechanism involved need not be shown in detail. A signal from the mechanism may be transmitted to electrical conductor 47 to a suitable control means (not shown), which in turn controls and operates valves 50 and 52.

The fluid stream flowing through outlet line 42 is split into two streams, one stream flowing through the larger branch line 49 provided with control valve 50 and the remainder flowing through a substantially smaller branch line 51 provided with control valve 52. These branch lines discharge into a single line 53 for transmitting the fluid farther. The control mechanism of valve 50 is connected by branch 54 to air line 48 and that of valve 52 by branch 55. It will be understood that the two valves 50 and 52 are arranged in the same manner as the valves in the precedingly described embodiment. That is to say the valves are arranged to operate in opposition to each other so that when larger valve 50 opens to allow an increased amount of fluid to flow through line 49, valve 52 will be operated to reduce the fluid transmitted through line 51. This arrangement reduces or eliminates the over control or hunting inherent in the control mechanism when only a single control valve is employed.

While in the preceding examples only two branch lines have been described, it will be immediately obvious that any number may be used. Such an arrangement of branch lines is shown in the fragmentary view in Figure 4. In this view a single line 60 leads into a plurality of equal sized branch lines 61, 62 and 63, which are provided respectively with control valves 64, 65 and 66. Control valves 64 and 65 are arranged to move directly in response to a signal, whereas valve 66 is arranged to move in the reverse direction. It will be evident that instead of two branch lines, as illustrated in Figures 1 to 3, and three branch lines as shown in Figure 4, a greater number may be employed if desired in practicing the present invention.

A system employing the present invention for regulating the temperature of a stream of fluid undergoing heating is shown in Figure 5. A furnace 70 is provided with a heating coil 71 into which a suitable liquid such as oil is introduced through inlet 72 and is removed via outlet line 74 having branches 75 and 76 provided with regulating valves 77 and 78, respectively. Branch 75 has a substantially greater capacity than branch 76. Inlet line 72 is also provided with a suitable orifice plate arrangement 79. The furnace is heated by two groups of gas burners, a smaller group 80 fed by branch line 81 containing regulating valve 82 and a larger group 83 fed by branch line 84 containing regulating valve 85. Branch lines 81 and 84 are both provided from main 86. The air pressure actuated valves 82 and 85 which control the amount of fuel gas fed into the furnace are activated by air line 87 from controller 88 which in turn responds to the stimulus given by pyrometer 103 having a lead 104 connected to controller 88.

The air supplied regulating valves 77 and 78 controlling the rate of flow of the oil in line 74 may be provided through branch line 89 from air coming from the supply line 90 through flow controller 91 which in turn is provided with suitable branch lines 92 and 92' activated by the pressure drop across orifice plate 79. Line 93, provided with branch lines 94 and 95, provides the means for altering the setting of valves 77 and 78 and is connected to a three-way valve 96 which can be adjusted to allow the flow of air into line 93 either from line 87 or line 89.

Valve 96 is preferably a plug-type three-way valve arranged to be controlled either by means of handle 97 or solenoid 98 linked to the valve through lever 99. The solenoid is arranged in a circuit including power supply 100 and is operated by limit switches (not shown) in flow controller 91.

When the operation in the apparatus of Figure 5 is being initiated, there is considerable fluctuation in the rate of flow in both the oil inlet line 72 and fuel gas line 86, and because of this wide fluctuation the flow in the oil line is controlled by the pressure drop across the line activating controller 91 and the flow of fuel in line 86 is controlled by pyrometer 103. Once the temperatures and rates of flow have been established the fluctuations become relatively small and greater accuracy in controlling the operations may be obtained by controlling both the rate of flow of oil through line 74 and fuel gas through line 83 in accordance with the pyrometer 103. Accordingly, when the relatively constant conditions have been established, valve 96 is manually operated to connect air line 93 with branch line 87 instead of with 89. This change in the setting of valve 96 connects both regulators 77 and 78 in the oil supply line and regulators 82 and 85 in the gas supply line to controller 88 activated by pyrometer 103. If the air supply to the system should fail the regulators 82 and 85 must shut off the flow of fuel gas to the furnace. Under such circumstances it is not desirable to begin again with the rate of flow of oil being heated and the rate of flow of the fuel gas both controlled from the pyrometer. Accordingly, a drop in the pressure in air line 87 below a predetermined amount causes flow controller 91 to close a switch which in turn initiates a flow of current through solenoid 98. Core 98a is drawn upwardly and operates the valve to disconnect line 93 from line 87 and connect it to line 89 so that when the failure of the air supply is remedied the control of the rate of flow of the oil being heated is in accordance with the pressure drop across orifice plate 79 while the rate of flow in fuel line 85 is in accordance with the temperature within the furnace.

A second solenoid valve 101 is provided in line 86 to close off the gas supply to burners 80 and 83 when the air pressure in line 87 drops below some predetermined value. Valve 101 is connected through switch 102 and branch line 105 and includes power supply 106 in the circuit. Solenoid valve 101 must be reset manually.

Having fully described preferred embodiments of the present invention, what I desire to claim is:

1. A control system comprising in combination a pipe line adapted to conduct a stream of fluid fuel, a relatively large and a relatively small branch line connected to said fuel line, a relatively large number of burners supplied by the relatively large branch line, and a relatively small number of burners supplied by said relatively small branch line with all of the burners arranged to supply heat to a common zone, a temperature responsive element arranged so that its temperature varies as a function of the temperature changes in the common zone, a control valve in said relatively large branch line operably connected to said temperature responsive element and arranged to increase or decrease the flow of fluid therein in direct response to the temperature changes in the common zone, said control valve and its connection to said temperature responsive element being such that said valve normally tends to hunt for each adjusted position thereof, and a second control valve in said relatively small branch line operably connected to said temperature responsive element and arranged to increase or reduce the rate of flow of fluid therein contrary to the changes in temperature occurring in the common zone and in proportion to the amount of change produced by said first control valve, said second control valve and its connection to said temperature responsive element being such that said valve normally tends to hunt for each adjusted position thereof.

2. A system for controlling the fluid level in a vessel comprising in combination a conduit fluidly connected with said vessel and extending into a plurality of parallel connected branch lines, a control valve arranged in each of said branch lines, a means arranged in said vessel provided with a float arranged to control the level as the level in said vessel varies, said float actuating a control means which actuates each of the valves in said branch lines, said control means being arranged to alter substantially the rate of flow of a major portion of fluid through less than all of said branch lines and to alter the rate of flow of a minor portion of the fluid in the remainder of said branch lines proportional to and directly opposite to change in the rate of flow of said major portion, said control means being of a type which normally tends to hunt for each adjusted position thereof.

3. Means for controlling an operation wherein it is desired to control the flow of a stream of fluid essential to the operation in response to a preselected variable in the operation comprising a pipe line adapted to convey said fluid stream, a group of parallel branch lines fluidly connected to said pipe line and adapted to convey said fluid stream, with a first portion of said group defining a major area of flow and a second portion of the group defining a minor area of flow, a control valve arranged in each of said branch lines and means arranged for actuating every valve of the first group in direct response to the preselected variable and for actuating every valve of the second group in inverse response to the preselected variable and in inverse proportion to the quantity of actuation of the first group, said actuating means being of a type which normally causes the actuated valve to hunt for each adjusted position thereof.

4. A control system comprising, in combination, a pipe line adapted to conduct a stream of fluid fuel, a group of parallel branch lines fluidly connected with the pipe line, with a first portion of the group defining a major area of flow and the remainder of the group defining a minor area of flow, a group of burners supplying heat to a common zone, with the major portion of the heat supplied by burners fluidly connected to the first portion of said group of parallel pipe lines and a minor portion supplied by the burners connected to the remainder of said group of parallel branch lines, a temperature-responsive element arranged so that its temperature varies as a function of the temperature changes in the common zone and a control valve in each of said branch lines operatively connected to said temperature-responsive element, with every valve applied to the first portion of the group arranged to increase or decrease the flow of fluid in direct response to the temperature changes of the temperature-responsive element and every control valve applied to the remainder of the group arranged to increase or reduce the rate of flow of fluid in inverse response to temperature changes of the temperature-responsive element and in inverse proportion to the change of each valve in the first part of the group of lines each of said control valves and its connection to said temperature responsive element being such that said valve normally tends to hunt for each adjusted position thereof.

5. A system for controlling the pressure in a vessel comprising, in combination, a group of parallel branch lines fluidly connected to said vessel, with a first portion of the group defining a major area of flow and the remainder of the group defining a minor area of flow, a pressure-responsive means arranged in said vessel, a control valve in each line of the first portion of the group operatively connected to the pressure-responsive means and arranged to increase or decrease the flow of fluid therein in direct response to pressure changes in said vessel and a control valve mounted in each line of the remaining portion of the group operatively connected to the pressure-responsive element and arranged to increase or reduce the rate of flow of fluid therein in inverse response to changes in pressure of the vessel each of said control valves and its connection to said pressure responsive means being such that it normally tends to hunt for each adjusted position thereof.

6. In an apparatus for handling a fluid to which a stream of fluid to be handled is delivered and in which it is desired to control a variable not present in the fluid stream, means for controlling the flow of the fluid stream in response to said variable comprising, in combination, a conduit adapted to convey said fluid stream to said apparatus, means for dividing said fluid stream ahead of said apparatus into major and minor portions, separate means for individually controlling the rates of flow of the major and minor portions of said stream and means, independent of said fluid stream, for transmitting variations in said variable to said separate control means, the control means on said major portion being such as to vary in one direction the flow of fluid in said major portion in direct proportion to the variations in said variable and the control means on said minor portion being such as to vary in the opposite direction the flow of fluid in said minor portion in direct proportion to the variations in said variable, the control means in each instance being of such character that it normally tends to hunt for each adjusted position thereof.

7. In an apparatus having an enlarged zone to which is delivered a fluid stream and in which it is desired to control a variable, not present in said fluid stream as delivered but influenced by the rate of delivery of said stream, in combination, a conduit adapted to convey said fluid stream to said enlarged zone, means for dividing said fluid stream ahead of said enlarged zone into major and minor portions, separate means for individually controlling the rates of flow of the major and minor portions of said stream, means in said enlarged zone adapted to generate an activating force varying directly with the variations in said variable and means for transmitting said activating force directly to said separate control means, the control means on said major portion being such as to vary in one direction the flow of fluid in said major portion in direct proportion to the variations in said activating force and the control means on said minor portion being such as to vary in the opposite direction the flow of fluid in said minor portion in direct proportion to said variations in said activating force, the control means in each instance being of such character that it normally tends to hunt for each adjusted position thereof.

8. An apparatus for conducting an operation to which are fed two fluid streams and in which it is desired to control a variable not present in either stream but influenced by the rates of flow of the respective streams, said variable varying directly with the rate of flow of one stream and inversely with the rate of flow of the other stream, separate conduits for conveying said streams to said apparatus, separate means for controlling the rate of flow of fluid in each of said conduits, means in said apparatus for generating an activating force varying directly with the variations in said variable and means for transmitting said activating force to said separate control means, the control means in said conduit delivering the fluid with the flow of which said variable varies directly being such as to vary the flow of fluid in said conduit in inverse proportion to variations in said activating force and the control means in said conduit conveying the fluid with the flow of which said variable varies inversely being such as to vary the flow of fluid in said conduit in direct proportion to variations in said activating force, the control means in each conduit being of a type which normally tends to hunt for each adjusted position thereof.

WILLIAM R. KEHOE.

REFERENCES CITED

The following references are of record in the file of this patent:

UNITED STATES PATENTS

| Number | Name | Date |
|---|---|---|
| 1,332,182 | Leeds | Feb. 24, 1920 |
| 2,244,932 | Anderson | June 10, 1941 |
| 2,191,627 | Schutt | Feb. 27, 1940 |
| 1,176,100 | Ronk | Mar. 21, 1916 |
| 2,008,151 | Nest | July 16, 1935 |